No. 676,400. Patented June 11, 1901.
J. A. SPENCER.
VALVE FOR PNEUMATIC TIRES, &c.
(Application filed July 18, 1900.)
(No Model.)
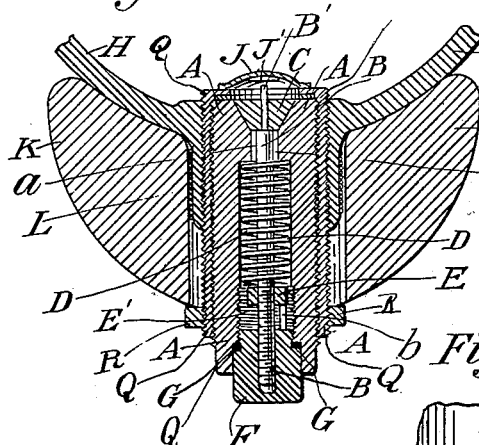
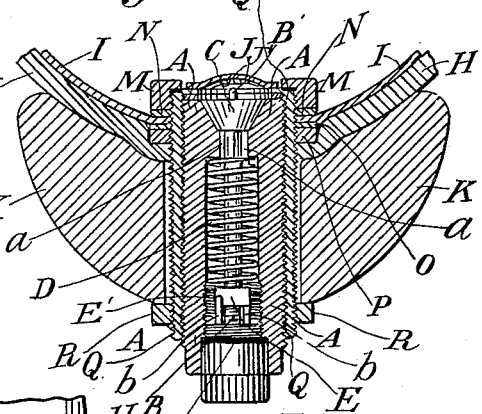
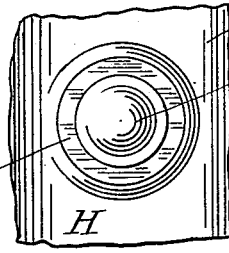
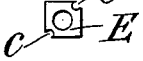
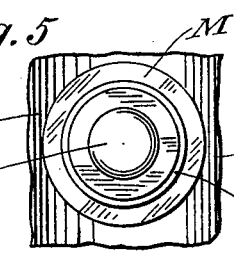
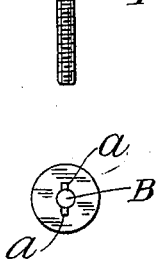
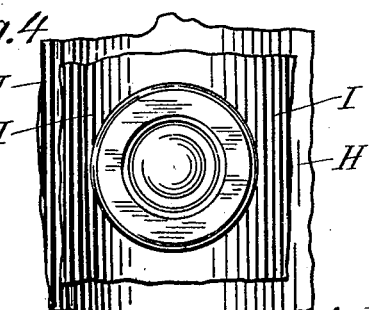
Witnesses
B. W. Pierce
Arthur J. Garfield
Inventor
John A. Spencer.
By St. John Day.
Attorney.
THE NORRIS PETERS CO., PHOTO-LITHO., WASHINGTON, D. C.

UNITED STATES PATENT OFFICE.

JOHN A. SPENCER, OF LOS ANGELES, CALIFORNIA.

VALVE FOR PNEUMATIC TIRES, &c.

SPECIFICATION forming part of Letters Patent No. 676,400, dated June 11, 1901.

Application filed July 18, 1900. Serial No. 24,118. (No model.)

*To all whom it may concern:*

Be it known that I, JOHN A. SPENCER, a citizen of the United States, residing at Los Angeles city, in the county of Los Angeles and State of California, have invented certain new and useful Improvements in Valves for Pneumatic Tires and for Analogous Uses, of which the following is a full, clear, and exact description or specification, reference being had to the annexed drawings and to the letters marked thereon.

My invention, which consists of certain new and useful improvements in valves for pneumatic tires, inflation-tubes, and which may be used for analogous purposes, has for its object not only to produce a reliable closing and opening valve, but at the same time it has for its object to enable the same valve to be used not only for pneumatic tires wherein an inflation-tube is used, but also for pneumatic tires wherein the valve is fastened into a nozzle projecting from the inner circle of the tire itself and in which class of tires an inflation-tube is not used, being in such cases unnecessary.

On the annexed drawings, Figure 1 is a transverse vertical section of my improved valve, shown as fastened into a tire wherein an inflation-tube is not used. Fig. 2 is a corresponding view of my improved valve, shown as applied to a tire wherein an inflation-tube is used. Fig. 3 is a plan of a portion of the interior of a portion of a tire, showing the upper end of my improved valve fastened therein and corresponding to Fig. 1. Fig. 4 is a plan of a part of the interior portion of a tire and a portion of the inflation-tube with my valve fastened into the inflation-tube thereof, corresponding to Fig. 2. Fig. 5 is an inverted plan of the lower part of the valve-casing and dust-cap. Fig. 6 is an elevation of the conical valve and valve-stem. Fig. 7 is a plan of Fig. 6. Fig. 8 is a plan of the square nut screwed upon the lower part of the valve-stem. Fig. 9 is an elevation of the dust-cap, showing the vertical projecting pins constituting the pin-spanner. Fig. 10 is a plan of the dust-cap.

In all of the drawings for the purpose of rendering the construction, arrangement, and operation of my improved valvular device and its several parts the better understood a scale considerably larger than the natural or real size of the valvular device constituting my invention is adopted.

My improved valvular device consists, as shown upon the annexed drawings, of the cylindrical casing, (marked A,) which is formed with a screw-thread exteriorly. The valve-stem is marked B, and at its upper end it carries the conical valve C, which rests in the corresponding seat formed in the upper part of the valve-casing A. The part of the stem immediately beneath the valve C is formed with laterally-projecting wings $a$ $a$, which enter corresponding recesses vertically cut in that portion of the valve-casing A immediately below the conical valve-seat. The remainder of the valve-stem B is cylindrical and the lower part thereof has a screw-thread cut upon it, as shown at Figs. 1, 2, and 6. The spiral spring D surrounds the valve-stem B, and the spring D fits easily into that part of the valve-casing beneath the portion thereof wherein the vertical grooves are cut, this portion of the valve-casing being made larger, so as to constitute a shoulder at the upper end thereof, against which the top of the spiral spring is pressed by the nut E, screwed upon the lower part of the valve-stem B, as shown. The nut E after having been screwed upon the valve-stem B as far as can conveniently be done by hand has then applied to it the dust-cap F, the pins $b$ $b$ of which enter the two holes or recesses $c$ $c$ in the nut E, as shown at Fig. 8, and the arrangement for turning the dust-cap around by applying the thumb and finger to its milled head enables the nut E to be screwed up on the valve-stem B to any extent necessary for compressing the spring D. The nut E may, indeed, be screwed so far up into the interior of the valve-casing as to allow the dust-cap to be closed upon or against its seat G in the smooth cylindrical interior of the bottom of the valve-casing, and a washer of rubber or other material is placed in this valve-seat to allow the dust-cap to make a perfectly-tight closure thereof, while the cylindrical portion of the dust-cap also fits well and closely into the cylindrical bottom portion of the valve-casing thereof, giving certainty of a perfect closing of the valve and the maintenance of all parts thereof in line with the central axis of the device. In addition the upper portion of the dust-cap may have some screw-threads, as shown at Fig. 9, cut upon it to fit into the lower part of the screwed portion of the socket E' for the air-pump connection and to enable the internal and external screws of the dust-cap F to operate without interference and at the same time to continuously draw down the stem and valve tighter upon its seat. It is essential that the screw within the socket E' and the screw upon the lower part of the valve-stem B should be of slightly-different pitch, the pitch of the screw on the upper outer part of the dust-cap being slightly slower than the pitch of the screw on the valve-stem.

In Figs. 1 and 3 the tire is marked H, and in Figs. 2 and 4 the tire is also marked H, while the inflation-tube is marked I in Fig. 2.

In Figs. 1 and 2 the part marked J is the flap-valve at the top of the device, and this preferably consists of a disk of vulcanized india-rubber fastened hingewise at one point of its circumference to the upper end of the outer valve casing or sheath Q. This valve J is mounted with a piece of hard rubber or metal J' at its under side, against which the upper extension B' of the valve-stem B presses, so as to lift the valve C when air is being compressed into the tire, inflation-tube, or other receptacle, and the pressure of the air within the tire, inflation-tube, or other receptacle closes this valve J at all other times. In both Figs. 1 and 2 the part marked K is a transverse section of the wooden tire commonly employed for holding and supporting inflated tires of bicycles, tricycles, or other vehicles, and the screw-nut R when tightened up against the tire K holds the outer casing Q in that wooden tire K.

As shown at Fig. 1, the valvular device is screwed into the outer casing Q, while it is held in the nozzle L of the tire H or in the inflation-tube I in Fig. 2, and as the lower part of the valve-casing A is milled circumferentially, after the manner of the milling upon the lower part of the dust-cap F, it follows the valve-casing A and all its connected parts are easily removable from or out of the tire H, Fig. 1, or the inflation-tube I, Fig. 2, by simply screwing the valve-casing A and the parts it contains out of the outer casing Q, while the outer casing Q remains firmly held in the nozzle L of the tire H by the binding-wire, as shown at Fig. 1, and into the inflation-tube I, Fig. 2, by means of the metallic cap M, screwed onto the upper end of the outer casing Q of the valvular device, having an elastic washer N beneath it. When the head thus formed of the valvular device is placed through the hole in the inflation-tube, then the washer O and nut P are screwed up over the exterior of the casing until that portion of the inflation-tube between the washer M and the washer O is sufficiently compressed.

It will be apparent from the drawings in connection with the preceding parts of this specification that the device may not only be quickly, easily, and effectually operated, but when closed the interior thereof is completely protected from dust and dirt; while it will be further apparent that the whole valvular device is removable from and replaceable at any time in the tire H or in the inflation-tube I by merely screwing the valve-casing A and its contents out from the outer casing Q, when by means of a very slight taper, not capable of being shown on the drawings, which is cut so that the valve-casing A, as it is screwed to the fullest practical extent within the outer casing Q, becomes very tightly held therein, the tightness of joint being perfected by the compression of the elastic washer at the top of the valve-casing, as shown at Figs. 1 and 2. A further consequence and advantage of this arrangement is that while the valvular device is removable from the outer casing Q the said valvular device is interchangeable from any one valve-casing Q to any other valve-casing Q.

I would have it understood that my invention includes all such changes and modifications in the shape of the valve and its parts as may fall within the terms and scope of the following claims.

Having now described the nature of my said invention and the best system, mode, or manner I am at present acquainted with for carrying the same into practical effect, I desire to observe in conclusion that what I consider to be novel and original, and therefore claim as the invention to be secured to me by Letters Patent, is as follows:

1. A valvular device for pneumatic tires and other compressed-air retainers, consisting of a valve-casing within which are contained a valve-stem with a valve at its upper end closing upon a seat at the upper end of said casing, with that part of the valve-stem below the valve having wings entering grooves in the corresponding part of said casing, an adjustable nut on the screw-thread of the lower end of the valve-stem, a spiral spring carried on said stem between said nut and a shoulder on said casing, and a dust-cap with pins thereon projecting upward for engaging with holes in said nut whereby said nut is screwed upward upon the valve-stem into or downward out of the interior of the casing, said dust-cap also completely closing the valvular device against dirt and dust, said dust-cap being constructed so as to contain the valve-stem centrally, by the dust-cap entering so as to fit closely and screw into the cylindrical recess at the bottom of the casing, with a thread of slower pitch than the pitch of the screw on the valve-stem, the whole being attached to the tire, inflation-tube, or other receptacle, by being screwed into a sheath so as to be removable and interchangeable, substantially as hereinbefore described.

2. The valvular device consisting of the cylindrical casing screwed externally, the valve and valve-stem within that casing, the spring on said valve-stem, the nut upon the screwed part of the valve-stem for compressing the spring upon said valve-stem between said nut and a shoulder at the upper interior part of said casing the valve-stem having wings at its upper part entering recesses in the upper interior part of the valve-casing, said valve-casing having a recess at its lower end, a nut upon said valve-stem and a dust-cap so constructed that said dust-cap acts as a pin-spanner in addition to its function as a dust-cap and operates said nut on the valve-stem, said nut being formed with flat sides, and said dust-cap having a screw-thread of slower pitch than the pitch of the screw of the valve-stem fitting into the cylindrical recess in the bottom of said casing, the whole being attached to the tire, inflation-tube, or other receptacle, by being screwed into a sheath permanently fastened into the tire, inflation-tube or other receptacle so as to be removable and interchangeable, substantially as hereinbefore set forth.

3. A valvular device for pneumatic tires and other compressed-air retainers, consisting of a valve-casing within which are contained a valve-stem with a valve at its upper end closing upon a seat at the upper end of said casing with that part of the valve-stem below the valve having wings entering grooves in the corresponding part of said casing, an adjustable nut on the lower end of the valve-stem, a spiral spring carried on said nut between said nut and a shoulder in said casing, and a dust-cap with pins thereon projecting upward for engaging with holes in said nut whereby said nut is screwed upward into or downward out of the interior of the casing, said dust-cap also completely closing the valvular device against dirt and dust, said dust-cap being constructed so as to contain the valve-stem centrally, by the dust-cap entering so as to fit closely into the cylindrical recess at the bottom of the casing, and having a screw-thread of slightly-slower pitch than the pitch of the screw-thread on the valve-stem, the whole being attached to the tire, inflation-tube or other receptacle, by being screwed into a sheath so as to be removable and interchangeable, with the valve at the upper end of said sheath within the tire, inflation-tube or other receptacle, substantially as hereinbefore described.

4. The valvular device consisting of the cylindrical casing screwed externally, the valve and stem within that casing, the spring on said valve-stem, the nut for compressing the spring upon said valve-stem between said nut and a shoulder at the upper interior part of said casing, the valve-stem having wings at its upper part entering recesses in the upper interior part of the valve-casing, said valve-casing having a recess at its lower end, a nut upon said valve-stem and a dust-cap so constructed that said dust-cap acts as a pin-spanner in addition to its function as a dust-cap and operates said nut on the valve-stem, said nut being formed with flat sides, and said dust-cap fitting into the cylindrical recess in the bottom of said casing, and screwing into the pump-socket connection and onto the valve-stem simultaneously, the whole being attached to the tire, inflation-tube, or other receptacle, by being screwed into a sheath permanently fastened into the tire, inflation-tube or other receptacle so as to be removable and interchangeable, with the valve at the upper end of said sheath within the tire, inflation-tube or other receptacle, substantially as hereinbefore described.

In testimony whereof I have hereunto set my hand and seal, this 13th day of June, in the year of our Lord 1900, in the presence of two subscribing witnesses.

JOHN A. SPENCER. [L. S.]

Witnesses:
  ST. JOHN DAY,
  ARTHUR J. GARFIELD.